United States Patent [19]

Lindsley

[11] Patent Number: 5,305,247
[45] Date of Patent: Apr. 19, 1994

[54] METHOD AND PROCESSOR FOR HIGH-SPEED CONVERGENCE FACTOR DETERMINATION

[75] Inventor: Brett L. Lindsley, Highwood, Ill.

[73] Assignee: Motorola, Inc., Schaumburg, Ill.

[21] Appl. No.: 956,446

[22] Filed: Oct. 2, 1992

Related U.S. Application Data

[63] Continuation of Ser. No. 806,778, Dec. 12, 1991, abandoned, which is a continuation of Ser. No. 715,003, Jun. 13, 1991, abandoned, which is a continuation of Ser. No. 458,915, Dec. 29, 1989, abandoned.

[51] Int. Cl.$^5$ .............................................. G06F 7/38
[52] U.S. Cl. .................................................. 364/748
[58] Field of Search ............... 364/748, 752, 761, 764

[56] References Cited

U.S. PATENT DOCUMENTS 4,878,190 10/1989 Darley et al. ........................ 364/752
4,949,296 8/1990 Malinowski ......................... 364/752

*Primary Examiner*—Long T. Nguyen
*Attorney, Agent, or Firm*—Darleen J. Stockley

[57] ABSTRACT

A high-speed processor utilizes combinational logic and range limitation for a modified input value to increase efficiency in convergence factor determination for convergent division and square root computation. An input value is modified to a value in a limited range, which is then partitioned into two subdivisions. By utilizing these two groupings, the processing platform minimizes time consumption in conversion factor determination by inverting selected binary bits to form a modified factor and utilizes that modified factor to facilitate high-speed convergence factor computation.

17 Claims, 3 Drawing Sheets

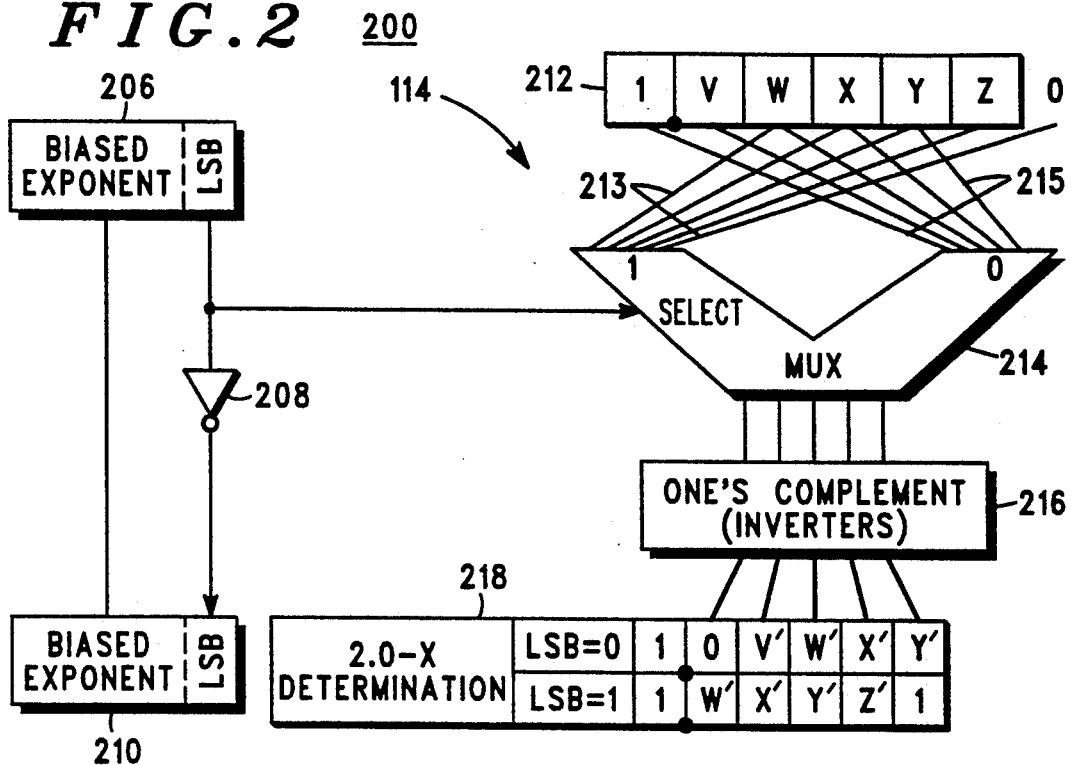
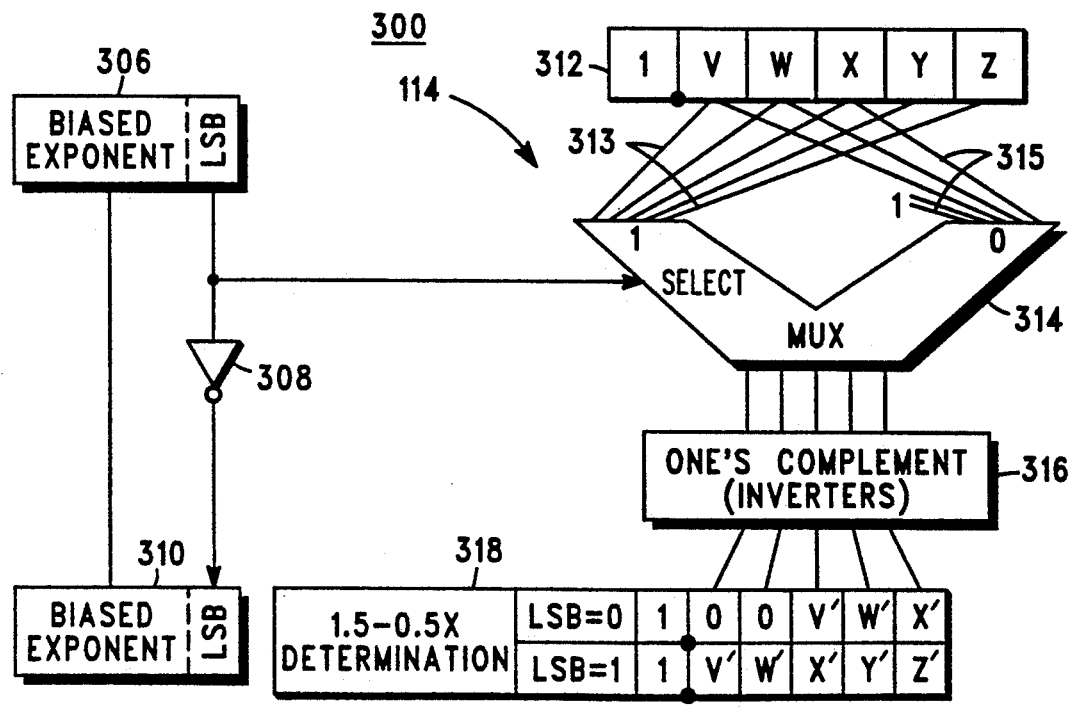

METHOD AND PROCESSOR FOR HIGH-SPEED CONVERGENCE FACTOR DETERMINATION

This is a continuation of application Ser. No. 07/806,778, filed Dec. 12, 1991 and now abandoned, which is a continuation of application Ser. No. 07/715,003, filed Jun. 6, 1991 and now abandoned, which is a continuation of application Ser. No. 07/458,915, filed Dec. 26, 1989 and now abandoned.

BACKGROUND OF THE INVENTION

Traditional implementations of floating-point convergent division algorithms and square root algorithm determinations are hampered by the lack of efficient computation of convergence factors within both algorithms. Convergence algorithms utilize repeated multiplication to achieve results of a predetermined accuracy. A feasible range of a modified input value, X, has been shown to be $0<X<2$. Further limitation of such a range would expedite algorithmic determinations.

In addition, determination of a convergence factor for convergent division generally requires a normalization step, a subtraction operation requiring a carry-propagate step, and another normalization step. Determination of a convergence factor for a square root computation, in addition, requires a scaling computation. Evaluation of a convergence factor for both the convergent division and the square root determination thus requires more computation cycles than a floating-point multiplication computation. Because the convergence factors occur serially in both computations, the inefficiency of the computation of the convergence factors has directly reduced the efficiency of computation within both the convergent division and square root determination algorithms.

The need exists for a more efficient method of determining convergence factors for convergent division and for square root determination to facilitate these two over-all processes within a digital platform.

SUMMARY OF THE INVENTION

The present invention enhances the efficiency of determining convergence factors for floating-point convergent division and square root determination in a numeric processor, such as a digital signal processor, by expediting the convergence factor determinations via combinational logic and by assuming a limited range for a modified input value for a convergence factor determination. This approach avoids a subtraction and carry-propagation operation, thereby allowing both convergent algorithm computations to be limited primarily by a multiplier latency time factor.

BRIEF DESCRIPTION OF THE DRAWINGS

FIG. 2 is a block diagram depicting one embodiment of a determination of a new normalized significand for enhancing convergence factor determination in a convergent division computation.

FIG. 3 is a block diagram depicting one embodiment of a determination of a new normalized significand for enhancing convergence factor determination in a square root determination.

BEST MODE FOR CARRYING OUT THE INVENTION

Figure 1:
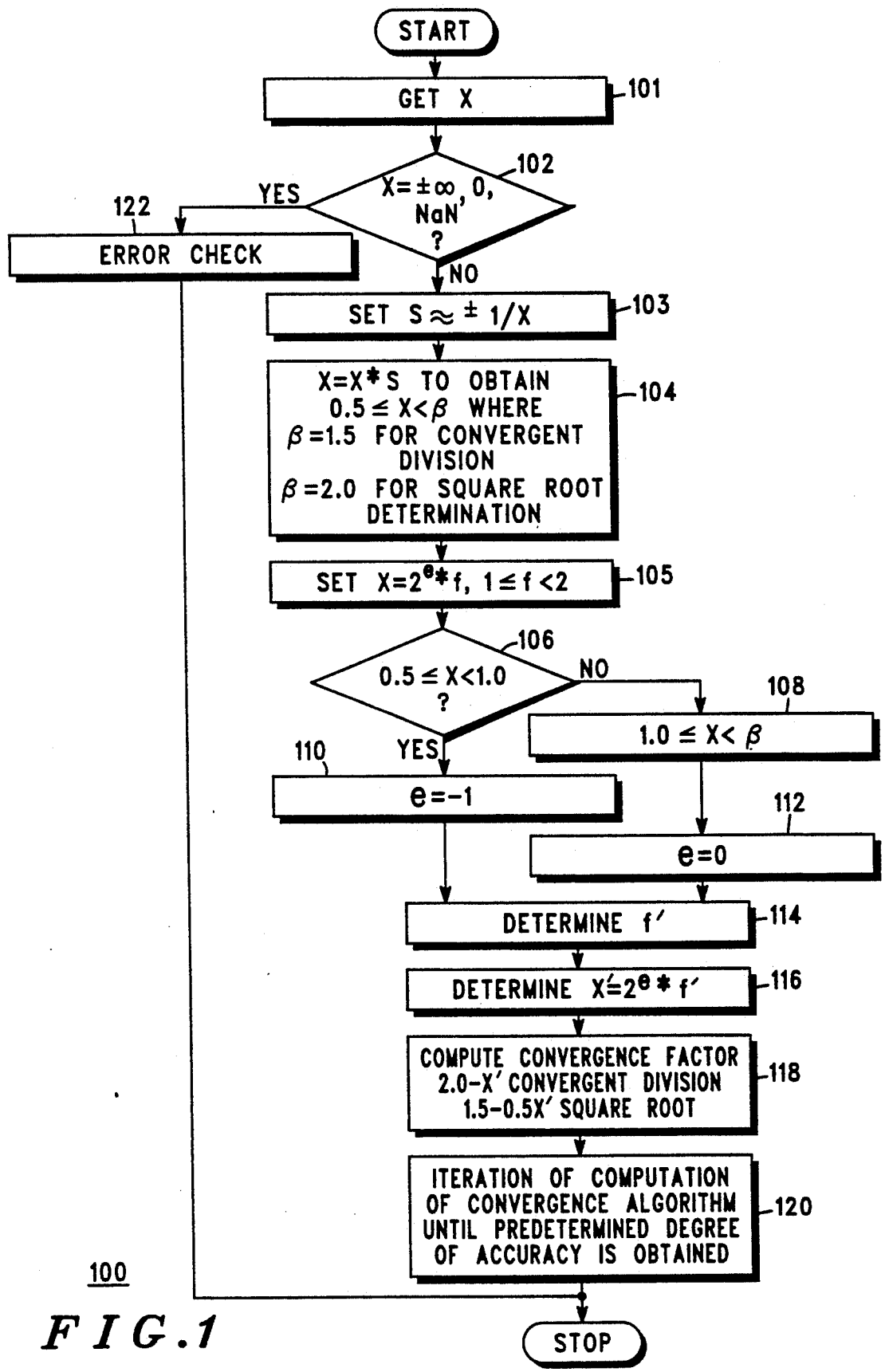
FIG. 1 is a block diagram depicting one embodiment of the invention.

FIG. 1, generally depicted by the numeral 100, is a flow chart setting forth one embodiment of the present invention that utilizes determination of a new normalized significand (f') via an expedient combinational logic, as opposed to multiple operations, to determine a new value for X (116), being X', and obtains a convergence factor utilized in a mathematical determination, being convergent division or square root determination, that is iterated until a solution with a predetermined degree of accuracy is obtained (118, 120).

To commence convergent division and square root determination utilizing floating-point arithmetic in accordance with one embodiment of the invention, a numeric processor (such as a digital signal processor) utilizes a processing platform to check an input X to determine whether or not X is equal to $\pm\infty$, $\pm0$, or Not-a-Number (NaN) (102). If X is equal to $\pm\infty$, $\pm0$, or NaN, an error-check mechanism bypasses convergence factor determination according to a rationale that utilizes a range limitation of X to $0.5 \leq X < \beta$ (122, $\beta$ being set out more specifically below). If X is other than $\pm\infty$, $\pm0$, or NaN, X is modified by multiplication by a suitable seed value S, $S \approx 1/X$ being a workable value, to obtain an X in a range of $0.5 \leq X < \beta$ such that $\beta$ is assigned 1.5 for convergent division and 2.0 for square root determination (103, 104). Set X to $X = 2^{e*} f$, provided that $1 \leq f < 2$ (105). The processing platform then checks whether or not $0.5 \leq X < 1.0$ (106). If $0.5 \leq X < 1.0$, the platform sets $e = -1$ (110). If it is not true that $0.5 \leq X < 1.0$, then $1.0 \leq X < \beta$ (108), and e is set to 0 (112). When e has been set (110, 112), f' is determined (114; additional detail regarding the determination of f' will be provided below), and X' is also determined (116), where $X' = 2^{e*} f'$. The platform utilizes X' to compute a convergence factor for the mathematical determination being invoked, being convergent division or square root determination (118). Then a convergence algorithm is computed for the mathematical determination being invoked, convergent division or square root determination, and is iterated until a solution with a predetermined degree of accuracy is obtained (120).

In one embodiment of a convergence factor determination for a convergent division determination, set forth in FIG. 2 and depicted generally by the numeral 200, after e has been set (110, 112), the processing platform biases the exponent e in accordance with the IEEE 754–1985 floating-point standard using an odd bias, yielding a biased exponent with a least significant bit (lsb)(206). If the least significant bit of the biased exponent is 1 (214), a binary f value of 1.wxyz0 is selected (212, 213). If the least significant bit of the biased exponent is 0, a binary f value of 1.1vwxy is selected (212, 215). The selected value of f to the right of the binary decimal is inverted (216) to yield a binary number of 1.0v'w'x'y' for f' if the related least significant bit is 0 and 1.w'x'y'z'1 for f' if the related least significant bit is 1 (218). In addition, the least significant bit of the biased exponent e is inverted (208) to form a final biased exponent for f' (210).

In one embodiment of a convergence factor determination for a square root determination, set forth in FIG. 3 and depicted generally by the numeral 300, after e has been set (112, 114), the processing platform biases the exponent e in accordance with the IEEE 754-1985 floating-point standard using an odd bias, yielding a biased exponent with a least significant bit (306). If the least significant bit of the biased exponent is 1 (314), a binary f value of 1.vwxyz is selected (312, 313). If the least significant bit of the biased exponent is 0 (314), a binary f value of 1.11vwx is selected (312, 315). The selected value of f to the right of the binary decimal is then inverted (316) to yield a binary number of 1.00v'w'x' if the related least significant bit is 0 and 1.v'w'x'y'z' if the related least significant bit is 1 (318). In addition, the least significant bit of the biased exponent e is inverted (308) to form a final biased exponent for f' (310).

It should be noted that, both in convergent division and square root determination, convergence factor determination will incur one lsb of error. The cause of the one lsb of error is due to the use of the one's complement rather than the two's complement operation. While the two's complement will not give the one lsb of error, the two's complement requires a carry propagation which slows down the convergence factor determination. The one's complement avoids this carry propagation and is preferred because of its speed. The one lsb of error is negligible in convergence algorithms since the computation is typically performed using extended precision hardware and is then rounded to a lower precision.

In the case of X=1, the one lsb of error will cause the result to be slightly less than one, specifically, one lsb less than one, and the exponent lsb changes accordingly.

Figure 4:
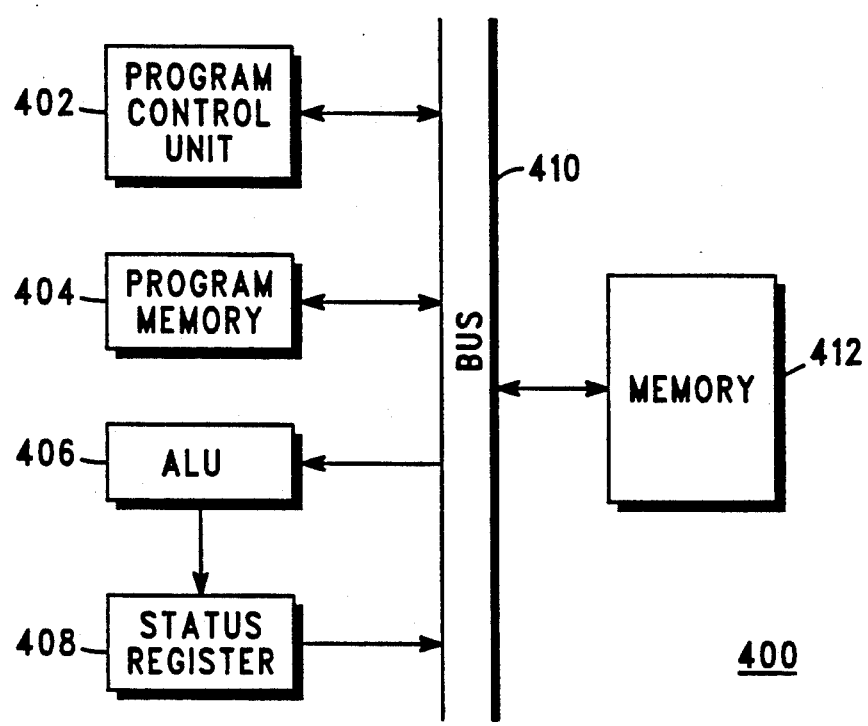
FIG. 4 is block diagram of a computer hardware implementation of the invention.

FIG. 4 depicts a hardware implementation of the present invention, generally depicted by the numeral 400. A computer program for implementation of the present invention may be stored in the program memory (404), other memory (412), or may be embodied in hardware in the arithmetic logic unit (ALU) (406) by allocation of data storage means and data manipulation means of a numeric processor. In one embodiment, the program control unit (402) utilizes the bus (410) to select a computer program to implement the present invention, and the status register determines whether $X = \pm \infty$, $\pm 0$, or NaN (408). If $X = \pm \infty$, $\pm 0$, or NaN, a processing platform processes an error-check mechanism, and processing stops. If X is other than $\pm \infty$, $\pm 0$, or NaN, the ALU converts X to a value X such that $0.5 \leq X < \beta$, where multiplication by $\approx 1/X$ is a workable conversion and $\beta$ is selected as 1.5 for convergent division and as 2.0 for square root determination (406). Thus, the processing platform of the computer program and the ALU together typically form an electrical first selecting unit for selecting an input value other than $\pm \infty$, $\pm 0$, or NaN, and the ALU typically functions as an electrical input value altering unit for converting a selected input value to a value X such that $0.5 \leq X \leq \beta$, the respective value of $\beta$ being a constant value related to the mathematical determination selected.

An electrical exponent unit, typically embodied in the ALU, generally comprises a primary selecting unit, a secondary selecting unit, a tertiary selecting unit, and a quaternary unit.

For convergent division a primary selecting means of the ALU selects a value of negative one for e where $0.5 \leq X < 1.0$, and a secondary selecting means of the ALU selects a value of zero for e where $1.0 \leq X < 1.5$ (406). For square root determination a tertiary selecting means of the ALU selects a value of negative one for e where $0.5 \leq X < 1.0$, and a quaternary means of the ALU selects a value of zero for e where $1.0 \leq X < 2.0$ (406). This exponent e is biased with an odd bias value according to the IEEE 754-1985 floating-point standard. The ALU computes a value of f, where $f = X/2^e$ provided that $1 \leq f < 2$, and outputs f as a series of binary bits consisting of a most significant bit, being one, to the left of a point and remaining binary bits to the right of the binary point, generally described here as 1.vwxyz (406). For convergent division and $0.5 \leq X < 1.0$ such that the lsb of the biased exponent is equal to zero, the ALU selects an output of a most significant binary bit of one to the left of the binary point and of one followed by the binary bits to the right of the binary point for the new binary bits to the right of the binary point (406). For convergent division and $1.0 \leq X < 1.5$ such that the lsb of the biased exponent is equal to 1, the ALU selects an output of a most significant binary bit of one to the left of the binary point and of the initially second and all following binary bits to the right of the binary point together with a zero for the new binary bits to the right of the binary point (406).

For square root determination and $0.5 \leq X < 1.0$ such that the lsb of biased exponent is equal to zero, the ALU selects an output of a most significant binary bit of one to the left of the binary point and of two ones followed by all bits initially to the right of the binary decimal for the new binary bits to the right of the binary point (406). For square root determination and $1.0 \leq X < 2.0$ such that the lsb of the biased exponent is equal to one, the ALU selects an output of a most significant binary bit of one to the left of the binary point and of all bits initially to the right of the binary point for the new binary bits to the right of the binary point (406). The ALU then inverts all bits to the right of the binary point for all mathematical determinations described above, the output being f' (406). The ALU also complements the lsb of the biased exponent to determine the new biased exponent (406).

For all such determinations, the ALU determines X', where $X' = 2^e * f'$ (406). For convergent division the ALU determines a convergence factor of $2.0 - X$ and for square root determination the ALU determines a convergence factor of $1.5 - 0.5X$ (406). The ALU utilizes one or more data manipulation and storage devices for computing a convergent division algorithm or a square root determination employing a related convergence factor until a solution with a predetermined degree of accuracy is obtained (406).

What is claimed is:

1. A numeric processor comprising:
 a processing platform for processing convergence factors utilizing an input signal value having other than $\pm \infty$, $\pm 0$, or Not-a-Number (NaN), for a mathematical determination of an electrical output signal, being convergent division determination/square root determination, wherein the input value is modified to a value X, such that X is limited to a range with a lower limit greater than or equal to 0.5 and an upper limit $\beta$ determined, at least in part, by the mathematical determination invoked and such that X is defined as $X = 2^e * f$, said platform comprising:
 A) electrical first selecting means operably coupled to receive the input signal value for selecting an input signal value other than $\pm \infty$, $\pm 0$, or NaN;
 B) electrical input signal value altering means being one of:
  B1) a read-only memory (ROM), and
  B2) an arithmetic logic unit (ALU), operably coupled to the first selecting means for converting a selected input signal value to a value X such that $0.5 \leq X < \beta$, the respective value of $\beta$ being a constant value related to the mathematical determination;

C) electrical exponent means of a read-only memory (ROM) and an arithmetic logic unit (ALU), operably coupled to the input signal value altering means for selecting a value for an exponent e;

D) electrical first determining means of a read-only memory (ROM) and an arithmetic logic unit (ALU), operably coupled to the input signal value altering means and the exponent means for determining a value for f, wherein $f = X/2^e$ such that $1 \leq f < 2$ and f is represented by a series of binary bits consisting of a most significant binary bit and remaining binary bits;

E) electrical locating means, operably coupled to the first determining means for placing the most significant binary bit of f, being 1, to the immediate left of a binary point with the remaining binary bits of f located to the right of the binary point;

F) electrical second selecting means of a read-only memory (ROM) and an arithmetic logic unit (ALU), operably coupled to the locating means and the first determining means for selecting binary bits to the right of the binary point in accordance with the value of X and the mathematical determination;

G) electrical complementing means being one of:
G1) a read-only memory (ROM), and
G2) an arithmetic logic unit (ALU), operably coupled to the second selecting means for determining a one's complement of the selected binary bits to the right of the binary point;

H) electrical combining means being one of:
H1) a read-only memory (ROM), and
H2) an arithmetic logic unit (ALU), operably coupled to the complementing means for combining the most significant bit of f, being 1, with the one's complement of the selected binary bits, thereby determining f', a new value for f;

I) electrical second determining means being one of:
I1) a read-only memory (ROM), and
I2) an arithmetic logic unit (ALU), operably coupled to the combining means for determining X', a new value for X, in electrical form such that $X' = 2^e * f'$; and J) electrical third determining means being one of:
J1) a read-only memory (ROM), and
J2) an arithmetic logic unit (ALU), operably coupled to the second determining means for generating a convergence factor in electrical form such that $X' = 2.0 - X$ being a new convergence factor for convergent division and $X' = 1.5 - 0.5X$ being a new convergence factor for square root determination.

2. The apparatus of claim 1, wherein the first selecting means for determining that an input value is other than $\pm \infty$, $\pm 0$, or NaN comprises a processing platform for executing an error check process.

3. The apparatus of claim 1, wherein the upper limit $\beta = 1.5$ for a mathematical determination of convergent division.

4. The apparatus of claim 1, wherein the upper limit $\beta = 2.0$ for a mathematical determination of a square root.

5. The apparatus of claim 1 wherein the exponent means for selecting a value for an exponent e comprises:

A) electrical primary selecting means operably coupled to the input value altering means for selecting a value of negative 1 for e for values of X such that $0.5 \leq X < 1.0$ in convergent division determination;

B) electrical secondary selecting means operably coupled to the input value altering means for selecting a value of zero for e for values of X such that $1.0 \leq X < 1.5$ in convergent division determination;

C) electrical tertiary selecting means operably coupled to the input value altering means for selecting a value of negative 1 for e for values of X such that $0.5 < X < 1.0$ in square root determination; and D) electrical quaternary means operably coupled to the input value altering means for selecting a value of zero for e for values of X such that $1.0 \leq X < 2.0$ in square root determination.

6. The apparatus of claim 1 wherein the second selecting means for selecting binary bits to the right of the binary point in accordance with the value of X and the mathematical determination outputs the following:

A) for a range of X such that $0.5 \leq X < 1.0$ in a convergent division determination, an output for the new binary bits to the right of the binary point being one followed by an initially second, and all following binary bits to the right of the binary point;

B) for a range of X such that $1.0 \leq X < 1.5$ in a convergent division determination, an output for the new binary bits to the right of the binary point being an initially second, and all following binary bits to the right of the binary point;

C) for a range of X such that $0.5 \leq X < 1.0$ in a square root determination, an output for the new binary bits to the right of the binary point being two ones followed by all bits initially to the right of the binary point; and D) for a range of X such that $1.0 \leq X < 2.0$ in a square root determination, an output for the new binary bits to the right of the binary point being all bits initially to the right of the binary point.

7. The apparatus of claim 1 wherein the complementing means for determining a one's complement of the selected binary bits to the right of the binary point comprises inverting all bit values to the right of the binary point.

8. The apparatus of claim 1 further including means for iterating a determination of the convergence factor until a solution with a predetermined degree of accuracy is reached for the mathematical determination invoked.

9. The apparatus of claim 1, further including at least a first data manipulation and storage device for iterating the determination of a convergence factor until a solution with a predetermined degree of accuracy is reached for the type of determination invoked.

10. The apparatus of claim 1, further including a computer program storage medium containing a fixed hardware embodiment of the first selecting means, the input value altering means, the exponent means, the first determining means, the locating means, the second selecting means, the complementing means, the combining means, the second determining means, and the third determining means of the apparatus such that the computer program storage medium itself can implement processing of the convergence factors.

11. The apparatus of claim 1, further including a computer program storage medium containing a computer program application of the processing achieved by the apparatus such that the computer program storage medium itself can process the convergence factors.

12. The apparatus of claim 1, further including a computer program storage medium containing a combination of at least a part of a computer program application of the processing achieved by the apparatus together with at least a part of a fixed hardware embodiment of the first selecting means, the input value altering means, the exponent means, the first determining means, the locating means, the second selecting means, the complementing means, the combining means, the second determining means, and the third determining means of the apparatus such that the two parts together coordinate to process the convergence factors.

13. A method for expediting and improving floating point computation of convergence factors $2.0-X$ and $1.5-0.5X$ for a mathematical determination using data storage means and data manipulation means of a numeric processor, the mathematical determination being convergent division or square root determination, for an input value X having other than $\pm\infty$, $\pm 0$, or NaN wherein X is limited to a certain range with a lower limit greater than or equal to 0.5 and an upper limit $\beta$ determined by the mathematical determination invoked and such that $X=2^{e*}f$, said method comprising the steps of:

A) storing an input value X in one or more data input devices of the numeric processor;

B) determining using one or more data manipulation devices in a read-only memory (ROM) and an arithmetic logic unit (ALU), of the numeric processor, that the input value is not $\pm\infty$, $\pm 0$, or NaN;

C) converting an input value X to a value X such that $0.5 \leq X < \beta$, wherein $\beta$ is a constant value related to the mathematical determination, using one or more data manipulation and storage devices in a read-only memory (ROM) and an arithmetic logic unit (ALU), of the numeric processor;

D) selecting a value for an exponent e using one or more data manipulation and storage devices a read-only memory (ROM) and an arithmetic logic unit (ALU), of the numeric processor;

E) determining a value for f wherein $f=X/2^e$, using one or more data manipulation and storage devices in a read-only memory (ROM), and an arithmetic logic unit (ALU), of the numeric processor, such that $1 \leq f < 2$ and f is represented by a series of binary bits consisting of a most significant bit and remaining binary bits;

F) setting the most significant bit of f to 1 with the remaining binary bits of f to the right of a binary point using one or more data manipulation and storage devices in a read-only memory (ROM) and an arithmetic logic unit (ALU), of the numeric processor;

G) selecting binary bits to the right of the binary point in accordance with the value of X and the mathematical determination invoked using one or more data manipulation and storage devices in a read-only memory (ROM) and an arithmetic logic unit (ALU), of the numeric processor;

H) one's complementing the selected binary bits to the right of the binary point using one or more data manipulation and storage devices in a read-only memory (ROM) and an arithmetic logic unit (ALU), of the numeric processor;

I) combining the most significant bit of f, being 1, with the one's complement of the selected binary bits, thereby determining a new value for f, designated f' using one or more data manipulation and storage devices in a read-only memory (ROM) and an arithmetic logic unit (ALU), of the numeric processor;

J) determining a new X, designated X', wherein $X'=2^{e*}f'$ using one or more data manipulation and storage devices in a read-only memory (ROM) and an arithmetic logic unit (ALU), of the numeric processor; and K) generating a convergence factor Y such that $Y=2.0-X'$ for convergent division and $Y=1.5-0.5X'$ for square root determination using one or more data manipulation and storage devices in a read-only memory (ROM) and an arithmetic logic unit (ALU), of the numeric processor.

14. The method of claim 13, further including allocating one or more data manipulation and storage devices for iterating the determination of a convergence factor until a solution with a predetermined degree of accuracy is reached for the mathematical determination invoked.

15. The method of claim 13, further including implementing the steps with a computer program storage medium containing a fixed hardware embodiment of a computer program of the method such that the computer program storage medium itself can execute the program.

16. The method of claim 13, further including implementing the steps with a computer program storage medium containing a computer program application of the method such that the computer program storage medium itself can execute the program.

17. The method of claim 13, further including implementing the steps with a computer program storage medium containing a combination of at least a part of a computer program application of the processing achieved by the apparatus together with at least a part of a fixed hardware embodiment of the first selecting means, the input value altering means, the exponent means, the first determining means, the locating means, the second selecting means, the complementing means, the combining means, the second determining means, and the third determining means of the apparatus such that the two parts together coordinate to process the convergence factors.

* * * * *